United States Patent
Morris et al.

(10) Patent No.: US 8,228,434 B2
(45) Date of Patent: Jul. 24, 2012

(54) METHOD AND APPARATUS FOR ADJUSTING A DISPLAY IN AN EXTINGUISHED STATE

(75) Inventors: Robert Edward Morris, Indianapolis, IN (US); Thomas Dale Yost, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1321 days.

(21) Appl. No.: 11/659,744

(22) PCT Filed: Aug. 10, 2004

(86) PCT No.: PCT/US2004/025768
§ 371 (c)(1),
(2), (4) Date: Feb. 8, 2007

(87) PCT Pub. No.: WO2006/022698
PCT Pub. Date: Mar. 2, 2006

(65) Prior Publication Data
US 2007/0236607 A1   Oct. 11, 2007

(51) Int. Cl.
*H04N 17/00* (2006.01)
*H04N 5/50* (2006.01)
(52) U.S. Cl. .................... 348/569; 348/173
(58) Field of Classification Search ............ 348/569, 348/564, 734, 553, 554, 576, 577, 678, 687, 348/173; 345/581, 589; 715/867
See application file for complete search history.

(56) References Cited

U.S. PATENT DOCUMENTS

| | | | | |
|---|---|---|---|---|
| 4,435,729 A | * | 3/1984 | Harwood et al. | 348/600 |
| 4,670,784 A | * | 6/1987 | Goldberg | 348/556 |
| 4,723,167 A | * | 2/1988 | Griffey | 348/730 |
| 5,193,006 A | * | 3/1993 | Yamazaki | 348/173 |
| 5,739,809 A | * | 4/1998 | McLaughlin et al. | 345/594 |
| 5,774,187 A | * | 6/1998 | Tsunoda | 348/553 |
| 6,891,564 B2 | * | 5/2005 | Fujimori et al. | 348/173 |
| 2002/0018069 A1 | | 2/2002 | Kim | |

FOREIGN PATENT DOCUMENTS

| | | |
|---|---|---|
| JP | 3-65369 | 6/1991 |
| JP | 10-79899 | 3/1998 |
| JP | 2001-60080 | 3/2001 |

OTHER PUBLICATIONS

Sony Corp. Mar. 24, 1998 paragraph '0021!—paragraph '00351; figure 1.
Hitachi Ltd. Mar. 6, 2001 paragraph '0009!—paragraph '00221; figures 1-5.
Search Report Mar. 11, 2005.

* cited by examiner

*Primary Examiner* — Victor Kostak
(74) *Attorney, Agent, or Firm* — Robert D. Shedd; Jeffrey M. Navon; Jerome G. Schaefer

(57) ABSTRACT

A method (300) for controlling a display function of an apparatus such as a television signal receiver is capable of remedying a display locked in an extinguished state to thereby ensure that a usable display is provided. According to an exemplary embodiment, the method (300) includes steps of detecting a power on condition of the apparatus (330), determining whether at least one predetermined display parameter associated with the display function exhibits at least one predetermined value responsive to the power on condition (340), and adjusting the at least one predetermined display parameter if the at least one predetermined display parameter exhibits the at least one predetermined value (360).

17 Claims, 2 Drawing Sheets

METHOD AND APPARATUS FOR ADJUSTING A DISPLAY IN AN EXTINGUISHED STATE

This application claims the benefit, under 35 U.S.C. §365 of International Application PCT/US2004/025768,filed Aug. 10, 2004, which was published in accordance with PCT Article 21(2) on Mar. 2, 2006, in English.

BACKGROUND OF THE INVENTION

Field of the Invention

The present invention generally relates to apparatuses such as television signal receivers that provide a display function, and more particularly, to a method and apparatus for controlling a display function that is capable of remedying a display locked in an extinguished state to thereby ensure that a usable display is provided.

Apparatuses such as television signal receivers may have a display function for providing visual outputs (e.g., video, text, still images, etc.) for user viewing. In many cases, parameters associated with this display function can be controlled by users. For example, certain apparatuses such as television signal receivers may enable users to electronically control various display parameters such as brightness, contrast, color, tint, sharpness, and the like via on-screen display (OSD) menus. In general, users desire that such display parameters have a broad range of adjustment potential to thereby provide a broad range of display options. Moreover, current integrated circuits (ICs) for display functions typically enable a broad range of adjustment potential. Accordingly, current apparatuses having a display function such as television signal receivers typically enable users to adjust display parameters over broad ranges of values.

However, when display parameters have a broad range of adjustment potential, problems may arise if users set certain display parameters to certain values, and are unable to re-adjust the display parameters. For example, with a display having a maximum OSD level of 50 IRE ("International Radio Engineers"—a standardized scale of brightness values), a brightness range of ±20 IRE, and a contrast range of 5:1, if brightness is set to −20 IRE and contrast is set to ⅖, the OSD level may be 0 IRE and the display may be extinguished (i.e., "blacked out"). If the brightness and contrast ranges are large enough, a user may extinguish a display by adjusting either brightness or contrast alone. If a display is extinguished, there are circumstances in which the display may become essentially locked in the extinguished state. Once a display is locked in the extinguished state, it is unusable in the sense that the user can not see the OSD menu to adjust the display parameters and restore the display to a non-extinguished, usable state. Having a display get locked in the extinguished state can occur in various different ways. For example, if a user presses the up or down keys of a user input device (e.g., remote control device, etc.) for an apparatus (e.g., television signal receiver) to adjust a display parameter (e.g., contrast, brightness) until an extinguished display is present, and then accidentally presses another key (e.g., clear, menu, left arrow, right arrow, etc.), the apparatus may switch modes and thereby lock the display in the extinguished state. In such a case, the up and down keys of the user input device may be unable to remedy the situation since the mode of the apparatus has changed. Another way a display can get locked in an extinguished state is if the apparatus providing the display function does not receive a user input within a predetermined time period after the extinguished display is present. In such a case, the apparatus may simply "time out" and lock the display in the extinguished state. This could happen for example to young children, or adults who are not familiar with apparatus operation.

One approach for addressing the foregoing problem is to provide a reset key for the apparatus or its remote control device which, when pressed, resets all parameter settings of the apparatus to nominal values. This approach for solving the problem, however, is not optimal since pressing the reset key also resets user settings other than display parameters settings, such as parental control settings. Therefore, discretion should be exercised when using such a reset key since its use may require users to adjust and reset all of the parameters settings of the apparatus, which may be time-consuming and inconvenient for the user.

SUMMARY OF THE INVENTION

Accordingly, there is a need for a method for controlling a display function of an apparatus such as a television signal receiver which addresses the foregoing problems, and is capable of remedying a display locked in an extinguished state to thereby ensure that a usable display is provided. The present invention disclosed herein addresses these and/or other issues.

In accordance with an aspect of the present invention, a method for controlling a display function of an apparatus is disclosed. According to an exemplary embodiment, the method comprises steps of detecting a power on condition of the apparatus, determining whether at least one predetermined display parameter associated with the display function exhibits at least one predetermined value responsive to the power on condition, and adjusting the at least one predetermined display parameter if the at least one predetermined display parameter exhibits the at least one predetermined value.

In accordance with another aspect of the present invention, an apparatus providing a display function is disclosed. According to an exemplary embodiment, the apparatus comprises memory means for storing data representing at least one predetermined display parameter associated with the display function. Processing means determines whether the at least one predetermined display parameter exhibits at least one predetermined value responsive to a power on condition of the apparatus, and adjusts the at least one predetermined display parameter if the at least one predetermined display parameter exhibits the at least one predetermined value.

In accordance with still another aspect of the present invention, a television signal receiver is disclosed. According to an exemplary embodiment, the television signal receiver comprises a memory operative to store data representing at least one predetermined display parameter associated with a display function. A processor is operative to determine whether said at least one predetermined display parameter exhibits at least one predetermined value responsive to a power on condition of the television signal receiver, and to adjust the at least one predetermined display parameter if the at least one predetermined display parameter exhibits the at least one predetermined value.

The above-mentioned and other features and advantages of this invention, and the manner of attaining them, will become more apparent and the invention will be better understood by reference to the following description of embodiments of the invention taken in conjunction with the accompanying drawings, wherein:

The exemplifications set out herein illustrate preferred embodiments of the invention, and such exemplifications are not to be construed as limiting the scope of the invention in any manner.

DETAILED DESCRIPTION OF THE INVENTION

Figure 1:
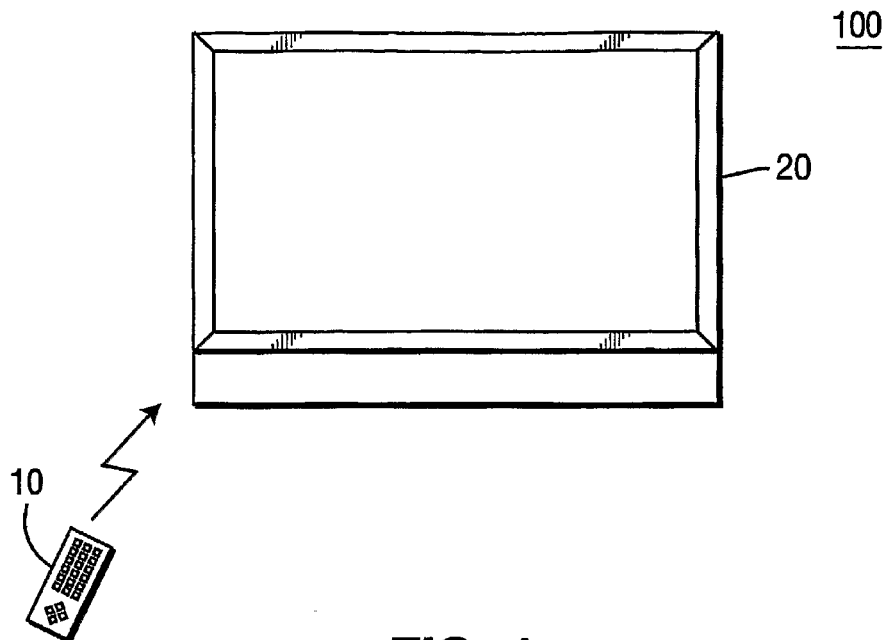
FIG. 1 is an exemplary environment suitable for implementing the present invention.

Referring now to the drawings, and more particularly to FIG. 1, an exemplary environment 100 suitable for implementing the present invention is shown. As indicated in FIG. 1, environment 100 comprises user input means such as user input device 10, and an apparatus 20 that provides a display function. According to an exemplary embodiment, apparatus 20 is embodied as a television signal receiver, but may be embodied as any device or apparatus that provides a display function.

User input device 10 is operative to generate and output control signals that control the operation of apparatus 20 and/or other devices. According to an exemplary embodiment, user input device 10 includes a plurality of input keys and outputs control signals in a wired and/or wireless (e.g., via infrared or radio frequency (RF) link, etc.) manner responsive to user depression of its input keys. User input device 10 may for example be embodied as a hand-held remote control device, wired and/or wireless keyboard, integrated control panel of apparatus 20, and/or other user input device.

Apparatus 20 is operative to receive signals including audio, video and/or data signals in analog and/or digital format from one or more signal sources such as terrestrial, cable, satellite, internet and/or other signal sources and to provide aural and/or visual outputs corresponding to these received signals. Apparatus 20 is also operative to process received signals and provide the resulting processed signals to one or more other devices, and to receive signals from other devices.

Apparatus 20 is further operative to provide OSD menus which enable users to adjust various settings of apparatus 20, including display parameter settings which affect the display function. According to the present invention, the display function of apparatus 20 is controlled to ensure that a usable display is provided. As previously indicated herein, a display may become locked in an extinguished state and therefore unusable if a user adjusts certain display parameters such as brightness and/or contrast to certain values. Once a display is locked in an extinguished state, the user can not see the OSD menu to adjust the display parameters and restore the display to a non-extinguished, usable state. According to the present invention, apparatus 20 is capable of correcting an extinguished display by detecting whether at least one predetermined display parameter (e.g., brightness, contrast, etc.) associated with the display function exhibits at least one predetermined value each time a power on condition occurs. If the at least one predetermined display parameter exhibits a predetermined value, apparatus 20 automatically adjusts the at least one predetermined display parameter to another (e.g., nominal) value to thereby restore the display to a non-extinguished, usable state. Further details regarding these aspects of apparatus 20 will be provided later herein.

Figure 2:
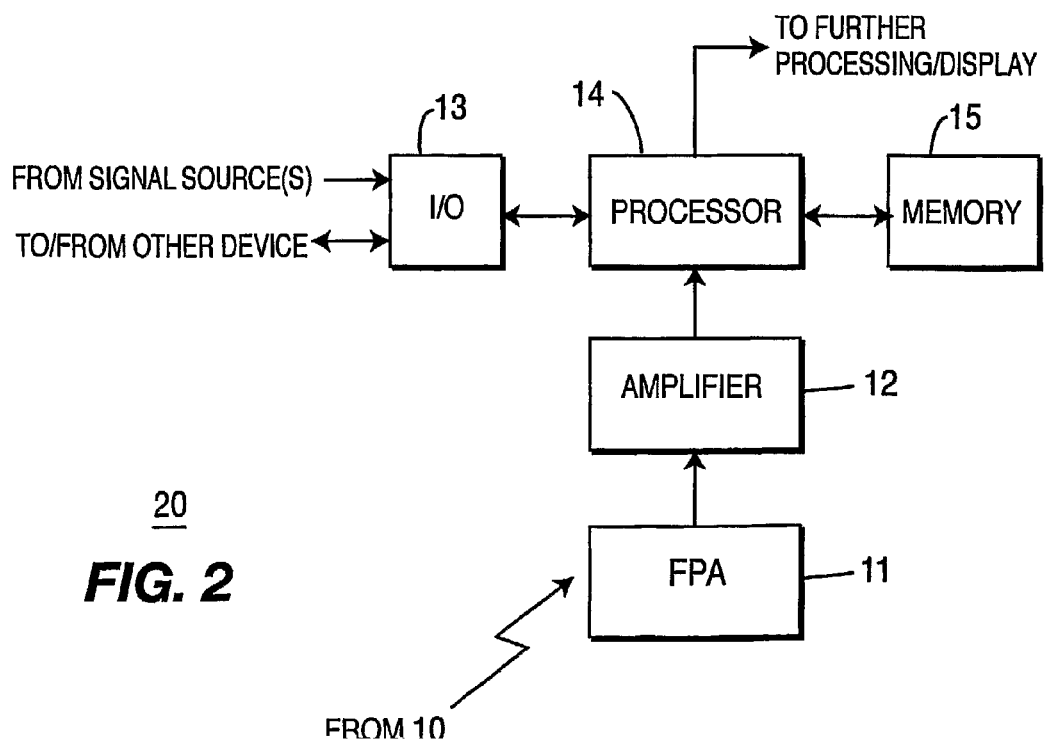
FIG. 2 is a block diagram providing further details of the apparatus of FIG. 1 according to an exemplary embodiment of the present invention.

Referring to FIG. 2, a block diagram providing further details of apparatus 20 of FIG. 1 according to an exemplary embodiment of the present invention is shown. Apparatus 20 of FIG. 2 comprises front panel means such as front panel assembly (FPA) 11, amplifying means such as amplifier 12, and input/output (I/O) means such as I/O block 13, processing means such as processor 14, and memory means such as memory 15. Some of the foregoing elements of FIG. 2 may be embodied using ICs, and some elements may for example be included on one or more ICs. For clarity of description, certain conventional elements associated with apparatus 20 such as certain control signals, power signals and/or other elements may not be shown in FIG. 2.

FPA 11 is operative to receive user inputs from user input device 10, and to output signals corresponding to the user inputs to amplifier 12. According to an exemplary embodiment, FPA 11 receives signals, such as IR and/or RF signals, from user input device 10 and generates corresponding signals which are output to amplifier 12. Amplifier 12 is operative to amplify the signals provided from FPA 11 for output to processor 14.

I/O block 13 is operative to perform I/O functions of apparatus 20. According to an exemplary embodiment, I/O block 13 is operative to receive signals such as audio, video and/or data signals in analog and/or digital format from one or more signal sources such as terrestrial, cable, satellite, internet and/or other signal sources. I/O block 13 is also operative to output processed signals to one or more other devices, and to receive signals from such devices.

Processor 14 is operative to perform various signal processing and control functions of apparatus 20. According to an exemplary embodiment, processor 14 processes the audio, video and/or data signals provided from I/O block 13 by performing functions including tuning, demodulation, forward error correction, and transport processing functions to thereby generate digital data representing audio, video and/or data content. The digital data produced from such processing functions may be provided for further processing (e.g., MPEG decoding, etc.) and output.

Processor 14 is also operative to execute software code to control the display function of apparatus 20 according to the present invention. According to an exemplary embodiment, processor 14 detects whether at least one predetermined display parameter (e.g., brightness, contrast, etc.) associated with the display function exhibits at least one predetermined value responsive to a power on condition of apparatus 20. If the at least one predetermined display parameter exhibits a predetermined value, processor 14 automatically adjusts the at least one predetermined display parameter to another (e.g., nominal value) to thereby ensure that the display is in a non-extinguished, usable state. Processor is also operative to perform and/or enable other functions of apparatus 20 such as, but not limited to, enabling OSD menus for user setup and control of apparatus 20, processing user inputs via user input device 10, reading and writing data from and to memory 15, and/or other operations.

Memory 15 is operative to perform data storage functions of apparatus 20. According to an exemplary embodiment, memory 15 stores data including, but not limited to, software code, OSD menu data, user setup data (e.g., display parameter data, etc.), and/or other data.

Figure 3:
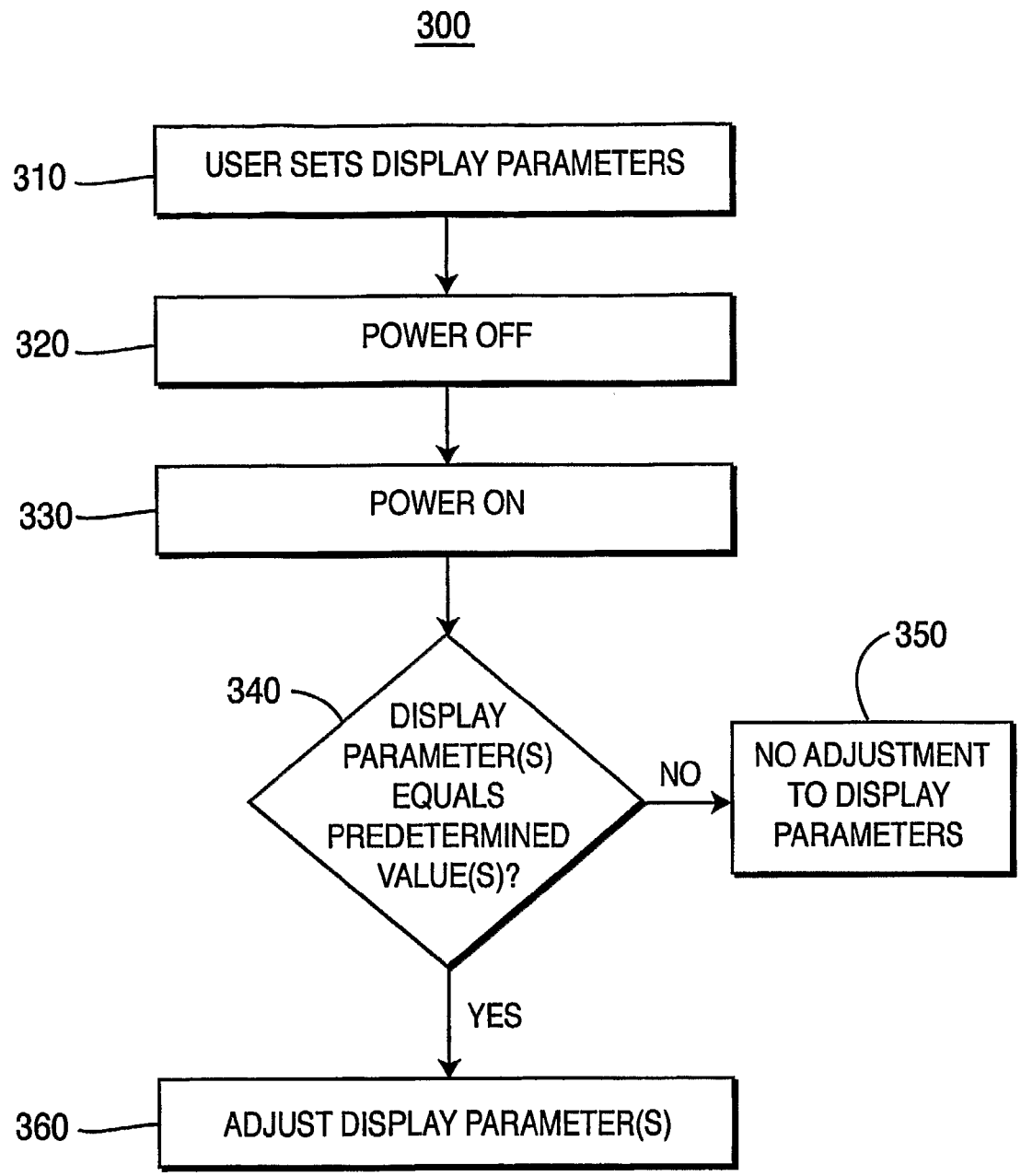
FIG. 3 is a flowchart illustrating steps according to an exemplary embodiment of the present invention.

To facilitate a better understanding of the present invention, an example will now be provided. Referring to FIG. 3, a flowchart 300 illustrating steps according to an exemplary embodiment of the present invention is shown. For purposes of example and explanation, the steps of FIG. 3 will be described with reference to the elements of environment 100 shown in FIGS. 1 and 2. The steps of FIG. 3 are merely exemplary, and are not intended to limit the present invention in any manner.

At step 310, a user sets the display parameters for the display function of apparatus 20. According to an exemplary embodiment, the user may set the display parameters for the display function at step 310 during a user setup process for apparatus 20 in which the user establishes various other settings of apparatus 20, such as parental control settings, and/or other settings. The display parameters for the display function of apparatus 20 may also be changed or reset by a user at any time after the original setup process. The user may set the display parameters for the display function at step 310 by providing inputs to apparatus 20 via user input device 10 responsive to one or more OSD menus provided by apparatus 20. According to an exemplary embodiment, the user may set various display parameters at step 310 including brightness, contrast, color, tint, sharpness, and other parameters. Moreover, the user may set the display parameters at step 310 to any allowable values he or she wants, including values which cause the display of apparatus 20 to be extinguished and unusable in the manner previously described herein.

At step 320, a power off condition of apparatus 20 occurs. According to an exemplary embodiment, the power off condition may occur as a result of apparatus 20 being turned off by a user via user input device. The power off condition may also occur at step 320 as the result of other things such as apparatus 20 being unplugged from its source of electrical power, and/or a power interruption to the household in which apparatus 20 is situated.

At step 330, a power on condition of apparatus 20 occurs. According to an exemplary embodiment, the power on condition may occur as a result of apparatus 20 being turned on by a user via user input device 10. The power on condition may also occur at step 330 as the result of other things such as apparatus 20 being plugged into its source of electrical power, and/or a restoration of power following a power interruption to the household in which apparatus 20 is situated.

At step 340, a determination is made as to whether at least one predetermined display parameter equals at least one predetermined value. According to an exemplary embodiment, the at least one predetermined display parameter includes at least one of contrast and brightness, and processor 14 makes the determination at step 340 by reading display parameter data for the current brightness and/or contrast settings from memory 15 and examining the same.

According to one exemplary embodiment, processor 14 examines only one display parameter such as brightness or contrast at step 340 since either one of these display parameters alone may be capable of extinguishing the display and rendering it unusable if set to certain values. According to another exemplary embodiment, processor 14 examines a plurality of display parameters such as brightness and contrast at step 340 since certain display parameter value combinations often cause a display to be extinguished and unusable. For example, with a display having a maximum OSD level of 50 IRE, a brightness range of ±20 IRE, and a contrast range of 5:1, if brightness is set to −20 IRE and contrast is set to ⅖, the OSD level may be 0 IRE and the display may be extinguished. It is noted that the predetermined value(s) referred to at step 340 may be included within a range of predetermined values and/or be represented as a percentage or percentile. For example, with a brightness range of ±20 IRE, any value less than −10 IRE (i.e., 25% of the range) may be considered a predetermined value at step 340. The process of establishing what values represent a predetermined value at step 340 is a matter of design choice. According to an exemplary embodiment, a display provided by apparatus 20 is extinguished and unusable if the at least one predetermined display parameter exhibits the at least one predetermined value at step 340.

If the determination at step 340 is negative, process flow advances to step 350 where no adjustment is made to the current display parameters. According to an exemplary embodiment, the display currently provided by apparatus 20 is not extinguished and unusable if the determination at step 340 is negative.

Alternatively, if the determination at step 340 is positive, process flow advances to step 360 where the at least one predetermined display parameter is adjusted. According to an exemplary embodiment, the display currently provided by apparatus 20 is extinguished and unusable if the determination at step 340 is positive. Also according to an exemplary embodiment, processor 14 adjusts the at least one predetermined display parameter to a nominal value at step 360 to restore the display currently provided by apparatus 20 to a non-extinguished and usable state. For example, with a brightness range of ±20 IRE where any value less than −10 IRE is considered a predetermined value, if a brightness value of −12 IRE is detected at step 340, processor 14 may adjust the brightness value to 0 IRE at step 360.

Moreover, it is not necessary that every display parameter determined by processor 14 to be equal to a predetermined value at step 340 be adjusted by processor 14 at step 360. According to an exemplary embodiment, processor 14 may adjust only one of the display parameters whose value equals a predetermined value since the adjustment of only one display parameter may be sufficient to restore the display to a non-extinguished, usable state. For example, if contrast and brightness both exhibit predetermined values at step 340, processor 14 may adjust only contrast at step 360 to restore the display. The following pseudo-code could for example be used by processor 14 to implement this example.

If Power_On and ((Contrast<10%) and (Brightness<25%)) then Set_Contrast (50%).

Accordingly, the specific manner and degree in which processor 14 adjusts display parameter values at step 360 may be a matter of design choice.

As described herein, the present invention provides a method and apparatus for controlling a display function that is capable of remedying a display locked in an extinguished state to thereby ensure that a usable display is provided. The present invention may be applicable to various systems, devices and/or apparatuses that provide or enable a display function, either with or without a display device. Accordingly, the phrase "television signal receiver" as used herein may refer to systems, devices or apparatuses including, but not limited to, television sets, computers or monitors that include a display device, and systems, devices or apparatuses such as set-top boxes, video cassette recorders (VCRs), digital versatile disk (DVD) players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for controlling a display function of an apparatus, comprising:

detecting a power on condition of said apparatus;

determining whether at least one predetermined display parameter associated with said display function exhibits at least one predetermined value responsive to said power on condition, wherein a display of the apparatus is in an extinguished state if said at least one predetermined display parameter exhibits said at least one predetermined value; and adjusting said at least one predetermined display parameter to set the display a non-extinguished state.

2. The method of claim 1, wherein said apparatus is a television signal receiver.

3. The method of claim 1, wherein said at least one predetermined display parameter includes at least one of contrast and brightness.

4. The method of claim 1, wherein said at least one predetermined display parameter exhibits said at least one predetermined value responsive to user inputs to said apparatus.

5. The method of claim 1, wherein said at least one predetermined value is included within a range of predetermined values.

6. The method of claim 1, wherein a display provided by said apparatus is unusable if said at least one predetermined display parameter exhibits said at least one predetermined value.

7. An apparatus capable of providing a display function, comprising:

memory means for storing data representing at least one predetermined display parameter associated with said display function; and processing means for determining whether said at least one predetermined display parameter exhibits at least one predetermined value responsive to a power on condition of said apparatus, wherein a display of the apparatus is in an extinguished state if said at least one predetermined display parameter exhibits said at least one predetermined value, and for adjusting said at least one predetermined display parameter to set the display to a non-extinguished state.

8. The apparatus of claim 7, wherein said apparatus is a television signal receiver.

9. The apparatus of claim 7, wherein said at least one predetermined display parameter includes at least one of contrast and brightness.

10. The apparatus of claim 7, wherein said at least one predetermined display parameter exhibits said at least one predetermined value responsive to user inputs to said apparatus.

11. The apparatus of claim 7, wherein said at least one predetermined value is included within a range of predetermined values.

12. The apparatus of claim 7, wherein a display provided by said apparatus is unusable if said at least one predetermined display parameter exhibits said at least one predetermined value.

13. A television signal receiver, comprising:

a memory operative to store data representing at least one predetermined display parameter associated with a display function; and a processor operative to determine whether said at least one predetermined display parameter exhibits at least one predetermined value responsive to a power on condition of said television signal receiver, wherein a display of the apparatus is in an extinguished state if said at least one predetermined display parameter exhibits said at least one predetermined value, and to adjust said at least one predetermined display parameter to set the display to a non-extinguished state.

14. The television signal receiver of claim 13, wherein said at least one predetermined display parameter includes at least one of contrast and brightness.

15. The television signal receiver of claim 13, wherein said at least one predetermined display parameter exhibits said at least one predetermined value responsive to user inputs to said television signal receiver.

16. The television signal receiver of claim 13, wherein said at least one predetermined value is included within a range of predetermined values.

17. The television signal receiver of claim 13, wherein a display provided by said television signal receiver is unusable if said at least one predetermined display parameter exhibits said at least one predetermined value.

* * * * *